US009779277B2

(12) United States Patent
Ohtsuka et al.

(10) Patent No.: US 9,779,277 B2
(45) Date of Patent: Oct. 3, 2017

(54) BIOMETRIC AUTHENTICATION DEVICE AND METHOD OF DRIVING AND CONTROLLING THE SAME

(71) Applicant: CASIO COMPUTER CO., LTD., Shibuya-ku, Tokyo (JP)

(72) Inventors: Toshihiko Ohtsuka, Hamura (JP); Takahiro Tomida, Hamura (JP); Akira Kashio, Musashino (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 15/061,995

(22) Filed: Mar. 4, 2016

(65) Prior Publication Data
US 2016/0267314 A1    Sep. 15, 2016

(30) Foreign Application Priority Data

Mar. 10, 2015 (JP) ................. 2015-046640

(51) Int. Cl.
G06F 21/32 (2013.01)
G06K 9/00 (2006.01)
G06F 21/35 (2013.01)

(52) U.S. Cl.
CPC ......... G06K 9/00013 (2013.01); G06F 21/32 (2013.01); G06F 21/35 (2013.01)

(58) Field of Classification Search
None
See application file for complete search history.

(56) References Cited

U.S. PATENT DOCUMENTS 8,570,148 B2 * 10/2013 Amano ................ A61B 5/0059
340/5.82
2014/0143784 A1 * 5/2014 Mistry ................ G06F 15/0208
718/102

FOREIGN PATENT DOCUMENTS

JP    2002312324 A    10/2002

* cited by examiner

Primary Examiner — K. Wong
(74) Attorney, Agent, or Firm — Holtz, Holtz & Volek PC

(57) ABSTRACT

A biometric authentication device has a structure member which is wearable to a user, and a biological information acquisition unit that acquires biological information of the user, and a biometric authentication unit that performs authentication of the user. The biological information acquisition unit is provided in a position where a finger of the user in contact when the structure member is worn/removed to/from the user, acquires first biological information with the finger of the user in contact with the biological information acquisition unit and second biological information which is at least one of a finger direction and action data, the finger direction is a direction of the finger in contact with the biological information acquisition unit and the action data is a data corresponding to spatial movement of the biometric authentication device when the structure member is worn/removed to/from the user. The biometric authentication unit performs the authentication based on the first and second biological information.

20 Claims, 13 Drawing Sheets

FIG. 4A
FIG. 4B
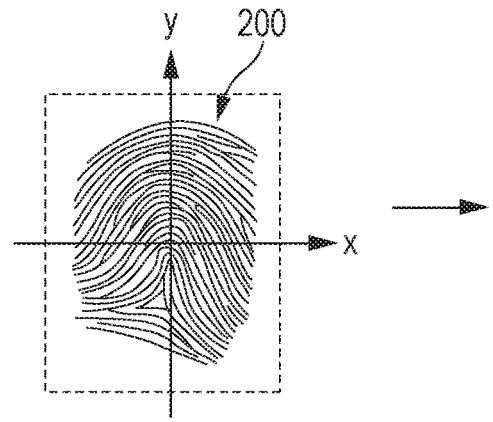
FIG. 4C
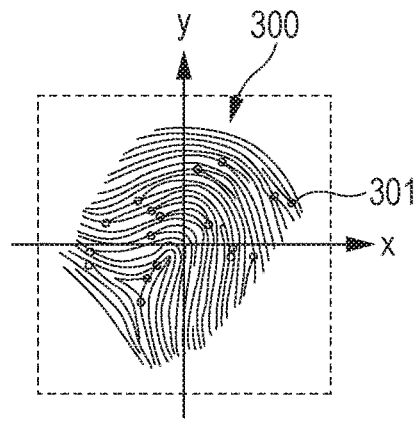
FIG. 4D
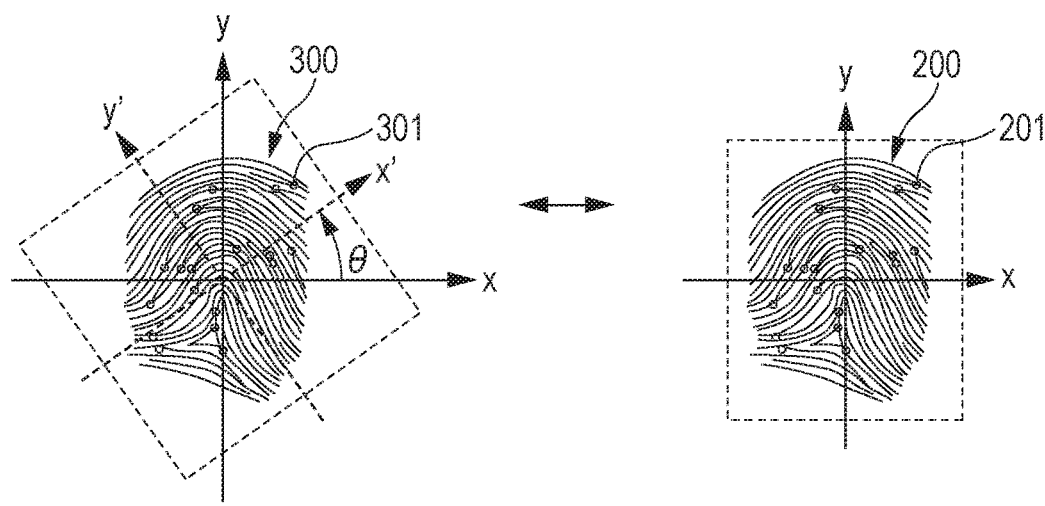

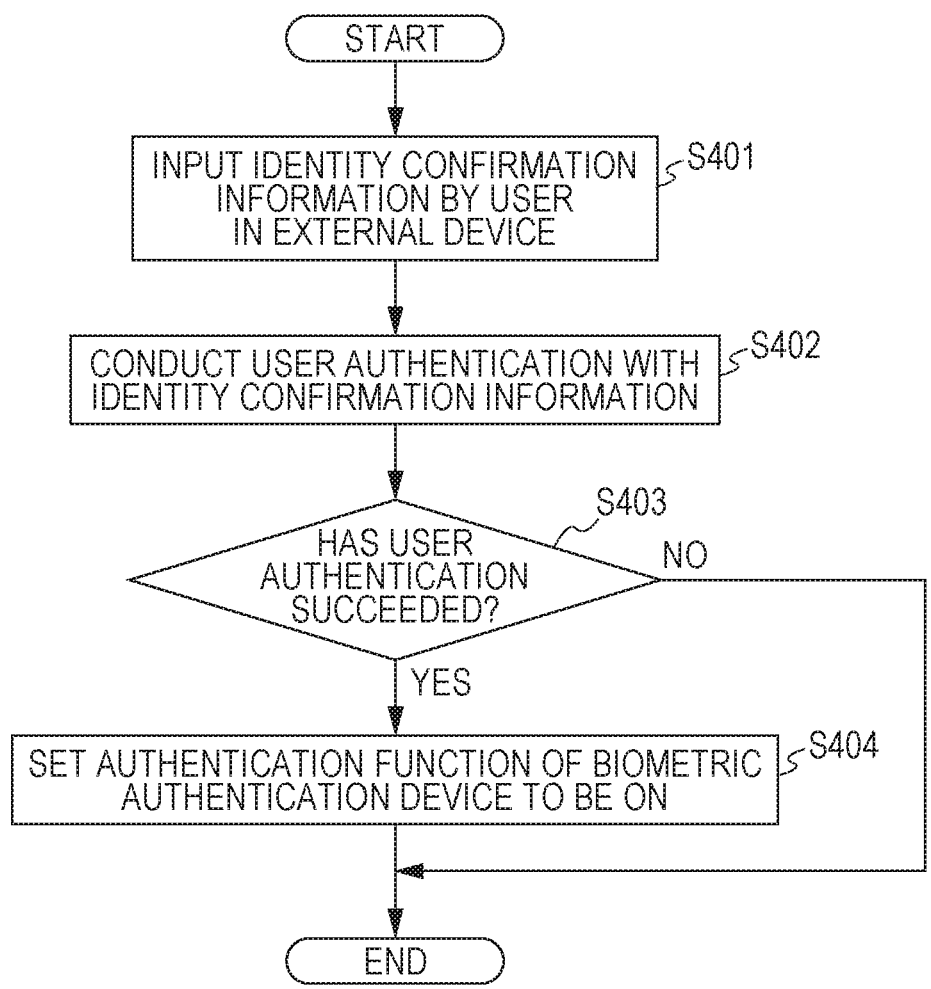

BIOMETRIC AUTHENTICATION DEVICE AND METHOD OF DRIVING AND CONTROLLING THE SAME

CROSS-REFERENCE TO RELATED APPLICATIONS

This application is based upon and claims the benefit of priority from the Japanese Patent Application No. 2015-046640, filed on Mar. 10, 2015, the entire contents of which are incorporated herein by reference.

BACKGROUND OF THE INVENTION

1. Field of the Invention

The present invention relates to a biometric authentication device and a method of driving and controlling the biometric authentication device.

2. Description of the Related Art

For example, JP 2002-312324 A discloses a technology for performing individual authentication in conjunction with a biometric authentication action and an action to wear a wristband, in order to enhance simplification of a system and convenience of a person to be authenticated.

According to the technology disclosed in the document, an authentication device can automatically acquire biological information when the person to be authenticated wears the wristband, and manage security of devices that require security, such as opening/closing a door.

However, the technology disclosed in JP 2002-312324 A employs a system that allows unauthorized use by copying of a fingerprint, and cannot dynamically attach information that is known by the person himself/herself only. Therefore, there are limitations to pursue high safety.

BRIEF SUMMARY OF THE INVENTION

The present invention has an advantage to provide a biometric authentication device and a method of driving and controlling the same, which make unauthorized use by copying of a fingerprint difficult, and improve safety against the unauthorized use.

According to an embodiment of the present invention, there is provided a biometric authentication device including: a structure member which is wearable to a user, a biological information acquisition unit, mounted on the structure member, configured to acquire biological information of the user; and a biometric authentication unit configured to perform authentication of the user, wherein the biological information acquisition unit is provided in a position where a finger of the user is in contact when the structure member is worn to the user or the structure member is removed from the user, the biological information acquisition unit acquires first biological information of the finger in contact with the biological information acquisition unit and second biological information which is at least one of a finger direction and action data, the finger direction is a direction of the finger in contact with the biological information acquisition unit and the action data is a data corresponding to spatial movement of the biometric authentication device when the structure member is worn to the user or the structure member is removed from the user, and the biometric authentication unit performs the authentication based on the first biological information and the second biological information.

According to another embodiment of the present invention, there is provided a method of driving and controlling a biometric authentication device, the biometric authentication device including a structure member which is wearable to a user, and a biological information acquisition unit, mounted on the structure member, in a position where a finger of the user is in contact when the structure member is worn to the user or the structure member is removed from the user, the method including the steps of: acquiring biological information of the user; and performing authentication of the user, wherein the step of acquiring biological information includes the steps of acquiring first biological information of the finger of the user in contact with the biological information acquisition unit when the structure member is worn to the user or the structure member is removed from the user, and acquiring second biological information which is at least one of a finger direction and action data, the finger direction is a direction of the finger in contact with the biological information acquisition unit and the action data is a data corresponding to spatial movement of the biometric authentication device when the structure member is worn to the user or the structure member is removed from the user, and in the step of performing authentication, the authentication is performed based on the acquired first biological information and the acquired second biological information.

BRIEF DESCRIPTION OF THE SEVERAL VIEWS OF THE DRAWING

FIGS. 4A to 4D are explanatory diagrams for describing an authentication operation in a biometric authentication device according to an embodiment of the present invention;

FIG. 11 is a flowchart illustrating a setting processing operation of a biometric authentication device by an external device;

DETAILED DESCRIPTION OF THE INVENTION

Embodiments of a biometric authentication device according to the present invention will be described in detail by illustrating the drawings below.

Note that the same element will be denoted with the same number or reference sign throughout the entire description of the embodiments.

Configuration of Embodiment

FIGS. 1A to 1D are diagrams illustrating an appearance of a biometric authentication device according to an embodiment, and a worn state of when the biometric authentication device is worn on a wrist portion that is a wearing portion of a user.

A biometric authentication device 10 according to the present embodiment is configured to be wearable on the wrist portion of the user. Further, the biometric authentication device 10 has a function to perform authentication of the user in conjunction with an action of a finger of when the biometric authentication device 10 is worn on the wrist portion of the user or removed from the worn state. Here, a wrist portion 14 is a wrist or an arm of the user.

Figure 1A:
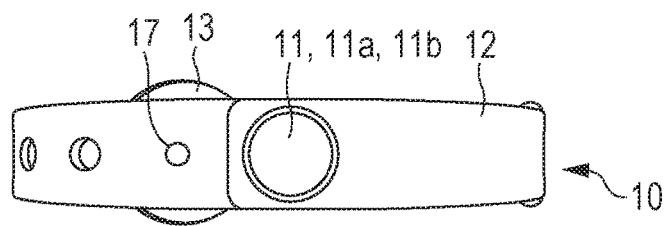
FIGS. 1A to 1D are diagrams illustrating an appearance of a biometric authentication device according to an embodiment of the present invention, and a worn state of when the biometric authentication device is worn on a wrist.
Figure 1B:
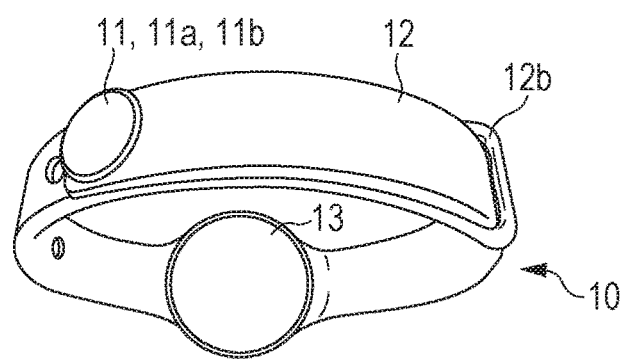

Therefore, as illustrated in FIGS. 1A and 1B, the biometric authentication device 10 includes a band member (structure member) 12 for being worn on the wrist portion 14. Further, a biological information acquisition unit 11 is mounted on a surface of a side that comes outside (hereinafter, written as surface) when the biometric authentication device 10 is worn on the wrist portion 14, on one end-side of the band member 12.

This biological information acquisition unit 11 includes a fingerprint sensor 11a, for example, and acquires fingerprint data (first biological information) of a finger F of the user as biological information.

The fingerprint sensor 11a in the biological information acquisition unit 11 is a capacitance-type fingerprint sensor, for example. Note that the fingerprint sensor 11a is not limited to the capacitance-type fingerprint sensor, and may be an optical-system sensor and does not limit the specific structure.

The biological information acquisition unit 11 may further include a motion sensor 11b that acquires action data corresponding to spatial movement of the biometric authentication device 10. The motion sensor 11b includes one or both of an acceleration sensor that detects acceleration and an angular speed sensor that detects angular speed.

The motion sensor 11b detects one or both of the acceleration and the angular speed corresponding to the spatial movement of the biometric authentication device 10 due to movement of the wearing portion of the wrist portion 14 where the biometric authentication device 10 is worn, and acquires one or both of acceleration data corresponding to the acceleration and angular speed data corresponding to the angular speed as action data.

One of a plurality of connection holes 17 and a through hole 12b formed to have a size into which one end side of the band member 12 can pass through are provided at the other end side of the band member 12.

A main body unit 13 having a function to control an authentication action based on biological information acquired by the biological information acquisition unit 11 is provided in a rough center in a length direction of the band member 12.

Note that the motion sensor 11b may be provided inside the main body unit 13.

The connection holes 17 have a size into which a connection pin 18 described below can be fit.

Figure 1C:
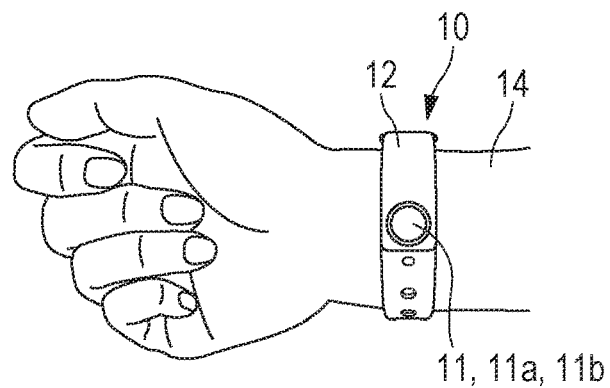

When the biometric authentication device 10 is worn on the wrist portion 14, the band member 12 is wound around the wrist portion 14, and the one end side of the band member 12 is brought to pass through the through hole 12b at the other end side, as illustrated in FIGS. 1B and 1C. Then, the connection pin 18 described below is inserted into the connection hole 17 and is fit therein. The connection pin 18 is provided at a side opposite to a mount position of the biological information acquisition unit 11, of a surface (hereinafter, written as back surface) of a side that comes inside of the band member 12 when the biometric authentication device 10 is worn on the wrist portion.

When the biometric authentication device 10 worn on the wrist portion 14 is removed from the wrist portion 14, the connection pin 18 inserted in the connection hole 17 is pulled out of the connection hole 17.

Figure 1D:
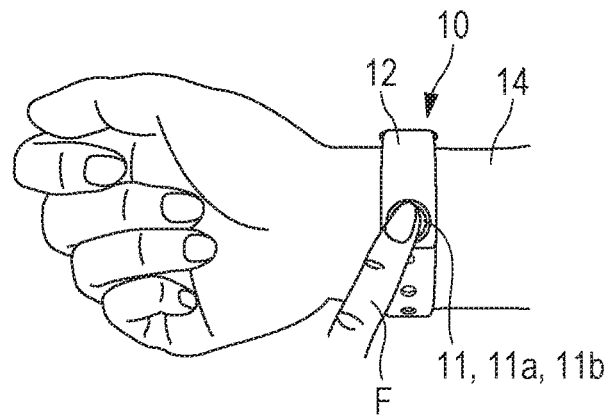

When the connection pin 18 is inserted into and fit in the connection hole 17 and the biometric authentication device 10 is worn on the wrist portion 14, and when the connection pin 18 inserted into the connection hole 17 is pulled out of the connection hole 17, and the biometric authentication device 10 is removed from the wrist portion 14, the finger F of the user is prompted to perform an action to be in contact with a detection surface of the fingerprint sensor 11a of the biological information acquisition unit 11, as illustrated in FIG. 1D.

At this time, the fingerprint sensor 11a of the biological information acquisition unit 11 acquires the fingerprint data of the finger F of the user, the finger F being in contact with the detection surface, as the biological information.

When the biometric authentication device 10 is worn on the wrist portion 14, and when the biometric authentication device 10 worn on the wrist portion 14 is removed from the wrist portion 14, the motion sensor 11b of the biological information acquisition unit 11 acquires action data (second biological information) corresponding to the spatial movement of the biometric authentication device 10 when the user allows the wrist portion 14 to perform specific movement and moves the wearing portion of the wrist portion 14 where the biometric authentication device 10 is worn.

This specific movement includes various actions such as an action to rotate the wrist portion 14 by a predetermined angle, having the length direction of the wrist portion 14 as an axis, an action to change the wrist portion 14 from an elbow by a predetermined angle, and an action to swing the wrist portion 14 by a predetermined number of times.

This specific movement can be known by the user himself/herself only, and can be differentiated every time the user uses the biometric authentication device 10. Therefore, the action data acquired by the biological information acquisition unit 11 corresponding to the specific movement can be used for authentication of the user.

As described below, the biometric authentication device 10 has a configuration to perform authentication of the user based on comparison between the action data acquired by the biological information acquisition unit 11 when the biometric authentication device 10 is worn on the wrist portion 14, and the action data acquired by the biological information acquisition unit 11 when the biometric authentication device 10 worn on the wrist portion 14 is removed from the wrist portion 14, in addition to the fingerprint data (first biological information) of the finger F of the user acquired by the fingerprint sensor 11a of the biological information acquisition unit 11.

That is, the biometric authentication device 10 is configured to be able to acquire the biological information such as the fingerprint data and the like of the user, in association with natural movement of the finger of the user of when the biometric authentication device 10 is worn on the wrist portion or the like of the user, and is removed from the wrist portion or the like.

Further, the biometric authentication device 10 is configured to acquire the action data corresponding to the spatial movement of the biometric authentication device 10 of when the biometric authentication device 10 is worn on the wrist portion or the like, and is removed from the wrist portion or the like.

Figure 2A:
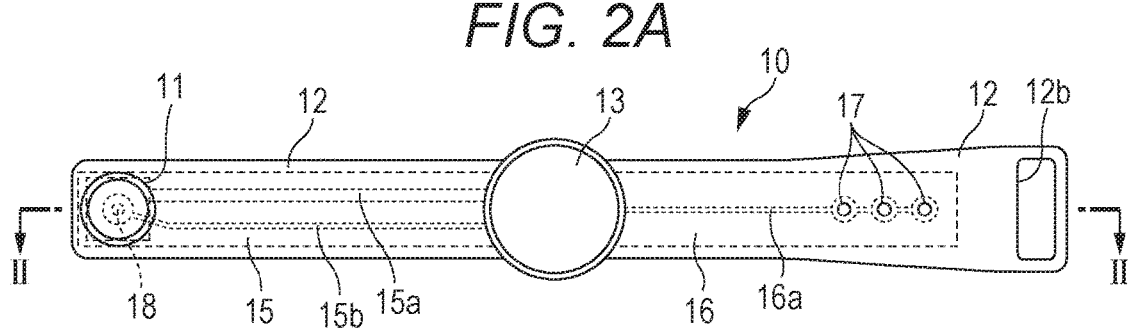
FIGS. 2A to 2E are schematic diagrams illustrating a surface, a back surface, and a cross-section structure of a biometric authentication device according to an embodiment of the present invention, and a contact structure at the time of wearing the biometric authentication device.

FIG. 2A illustrates a structure of the biometric authentication device 10 at the surface side.

Figure 2B:
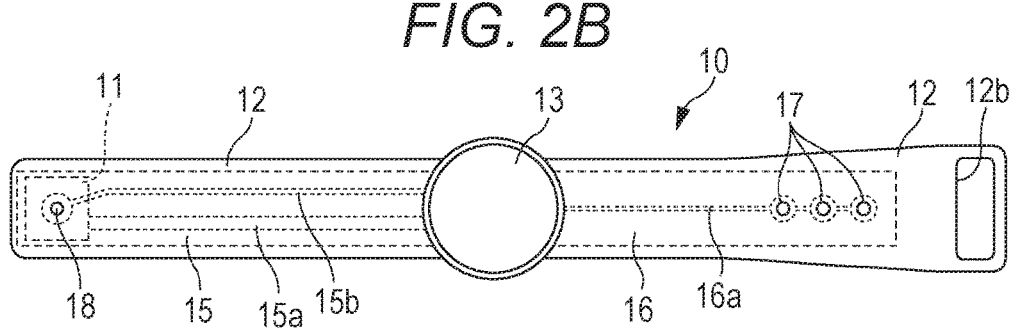

FIG. 2B illustrates a structure of the biometric authentication device 10 at the back surface side.

Figure 2C:
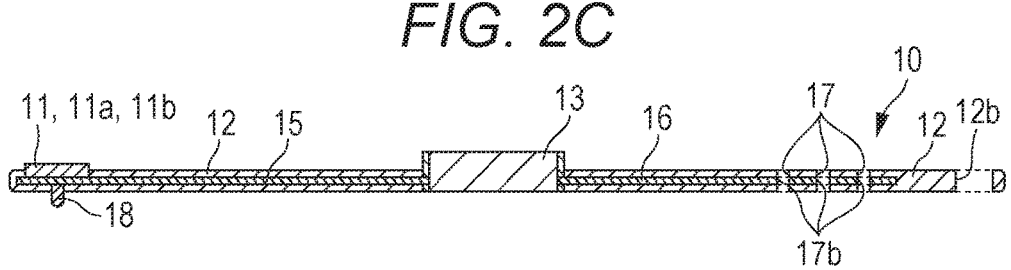

FIG. 2C illustrates a diagram of a cross-section structure of when a cross section along the II-II line of FIG. 2A is viewed in the arrow direction.

Figure 2D:
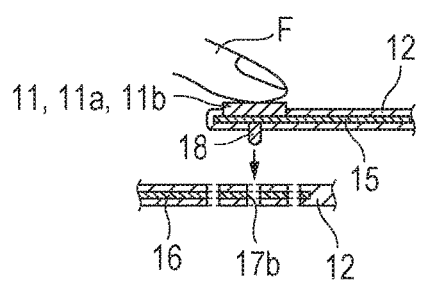
Figure 2E:
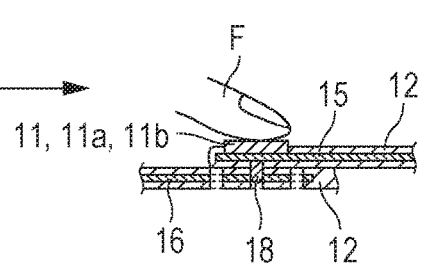

FIGS. 2D and 2E illustrate a contact structure of the connection pin 18 and the connection holes 17 of when the biometric authentication device 10 is worn.

As illustrated in FIGS. 2A to 2C, a flexible wiring board 15 with one end connected to the main body unit 13 is built in between the one end side of the band member 12 and the main body unit 13. A flexible wiring board 16 with one end connected to the main body unit 13 is built in between the other end side of the band member 12 and the main body unit 13.

The biological information acquisition unit 11 is mounted on the surface side of the band member 12 at the one end side of the flexible wiring board 15, and the connection pin 18 is mounted on the back surface side of the band member 12 at the one end side of the flexible wiring board 15.

As illustrated in FIG. 2C, the connection pin 18 is provided to protrude from the back surface of the band member 12.

The biological information acquisition unit 11 includes the fingerprint sensor 11a, and the fingerprint sensor 11a is mounted such that a part of the fingerprint sensor 11a is embedded in the band member 12. Here, the detection surface of the fingerprint sensor 11a is the surface side of the band member 12.

Through holes 17b having the same size as the connection holes 17 and having a conductor formed on an inner peripheral surface are provided in positions respectively corresponding to the plurality of connection holes 17 of the band member 12 at the other end side of the flexible wiring board 16.

Wiring patterns 15a and 15b are formed on the flexible wiring board 15. The main body unit 13 and the biological information acquisition unit 11 are electrically connected through the wiring pattern 15a, and the main body unit 13 and the connection pin 18 are electrically connected through the wiring pattern 15b.

A wiring pattern 16a is formed on the flexible wiring board 16. The main body unit 13 and the inner peripheral surfaces of the through holes 17b are electrically connected through the wiring pattern 16a.

Here, it is favorable that conductors electrically connected with the conductors on the inner peripheral surfaces of the through holes 17b are provided on inner peripheral surfaces of the connection holes 17 of the band member 12.

When the biometric authentication device 10 is worn on the wrist portion 14, the connection pin 18 provided on the back surface side of the one end side of the band member 12 is inserted into the connection hole 17 at the other end side of the band member 12 and in an appropriate position according to the size of the wrist portion 14, as illustrated in FIG. 2D.

Accordingly, the band member 12 is wound around and fixed to the wrist portion 14, as illustrated in FIG. 1C, and the connection pin 18 is fit to the through hole 17b and is electrically connected with the wiring pattern 16a, as illustrated in FIG. 2E.

Here, the connection pin 18 and the through hole 17b form a wearing-detection connection terminal unit 19 in the present invention. Here, the connection hole 17 has a known structure in which the connection pin 18 is fit to the connection hole 17 and cannot be pulled out, once the connection pin 18 is pushed in to the connection hole 17, and the connection pin 18 can be pulled out when the connection pin 18 is pushed in to the connection hole 17 again.

Then, when the main body unit 13 detects that the connection pin 18 and the wiring pattern 16a have been electrically connected, with the wearing-detection connection terminal unit 19, the main body unit 13 determines that the biometric authentication device 10 has been worn on the wrist portion 14.

The main body unit 13 performs authentication of the user based on matching of the fingerprint data acquired by the biological information acquisition unit 11 at the time of an operation to wear the biometric authentication device 10 on the wrist portion 14.

The main body unit 13 is configured to perform authentication of the user based on the matching of the fingerprint data acquired by the biological information acquisition unit 11, and determination of whether a finger direction of the finger F being in contact with the fingerprint sensor 11a and a finger direction of the finger F of when the biometric authentication device 10 is worn on the wrist portion 14 are the same, at the time of an operation to remove the biometric authentication device 10 from the wrist portion 14. Details will be described below.

Note that the present invention is not limited to the form in which the biological information is based only on the fingerprint data of the user.

Biological information unique to the user, such as a biological impedance, a vein pattern, and a pulse wave pattern, which are to be described below, may be added, in addition to the biological information based on the fingerprint data.

Accordingly, a more accurate authentication result can be obtained.

Figure 3:
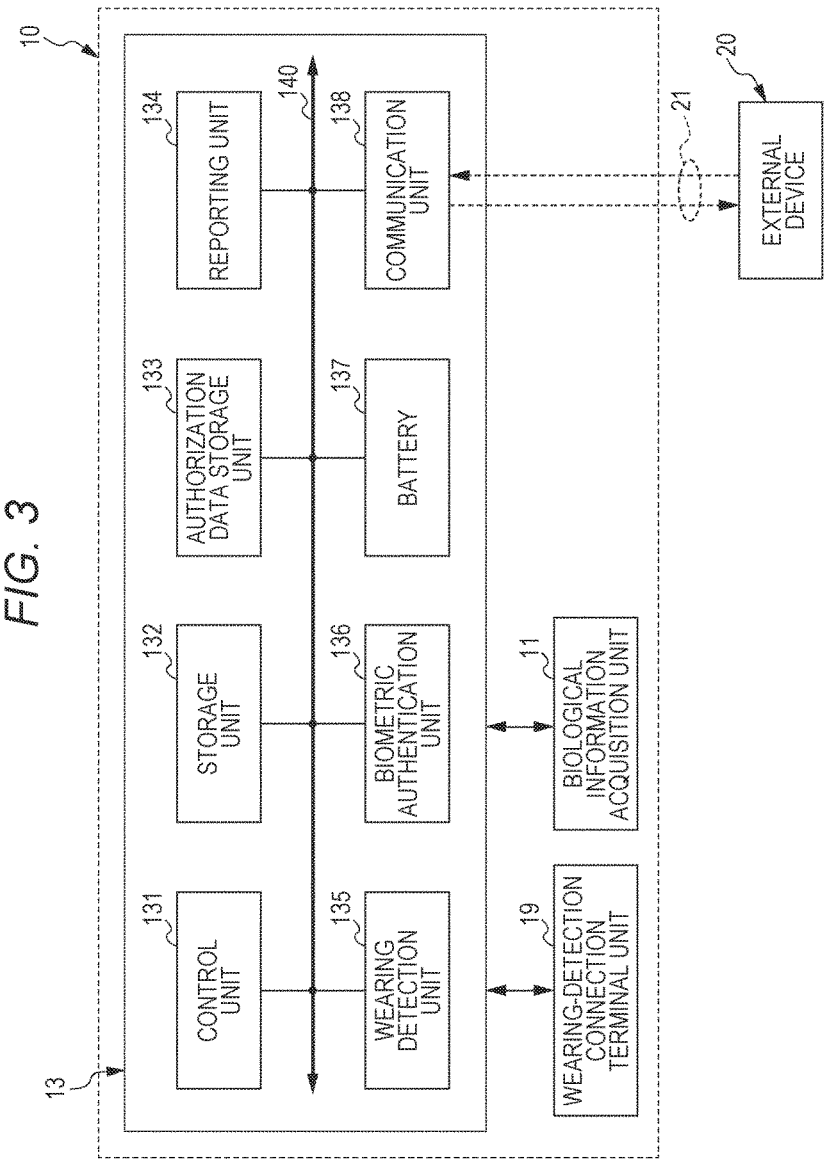
FIG. 3 is a block diagram illustrating an internal configuration of a biometric authentication device according to an embodiment of the present invention.

FIG. 3 is a block diagram illustrating an internal configuration of the biometric authentication device 10 according to the present embodiment.

As illustrated in FIG. 3, the biometric authentication device 10 according to the present embodiment includes the main body unit 13, the wearing-detection connection terminal unit 19, and the biological information acquisition unit 11. The main body unit 13 includes a control unit 131, a storage unit 132, an authentication data storage unit 133, a reporting unit 134, a wearing detection unit 135, a biometric authentication unit 136, a battery 137, and a communication unit 138.

In the main body unit 13, the blocks 131 to 138 are commonly connected through an internal bus 140 configured from a plurality of lines for control, addresses and data.

The control unit 131 is a processor (computer) that is a control center of the biometric authentication device 10 according to the present embodiment. The control unit 131 receives power supply from the battery 137, and controls the blocks 132, 133, 134, 135, 136, and 138, and the biological information acquisition unit 11 based on a program recorded in the storage unit 132.

In the storage unit 132, the program executed by the control unit 131 is stored.

In the authentication data storage unit 133, reference fingerprint data (reference biological information) and reference direction data used to perform authentication of the user are stored.

The authentication data storage unit 133 is a flash memory or the like separately prepared from the storage unit 132.

Note that the biometric authentication device 10 may have a configuration in which the authentication data storage unit 133 is not included, and the reference fingerprint data and the reference direction data are stored in the storage unit 132.

The communication unit 138 can set a wired or wireless communication link 21 with an external device 20 (a personal computer (PC), a smart phone, a gate, and the like that require authentication at the time of use for security management) set in advance, and can mutually perform information communication, using wired means such as a universal serial bus (USB), or wireless means such as Bluetooth (registered trademark), NFC, or Wi-Fi.

When the biometric authentication device 10 is worn on the wrist portion 14 of the user and the authentication of the user can be made, the communication unit 138 transmits, to the external device 20, information such as identification information (ID) of the user and the like necessary to cancel a security lock, to set the external device 20 to be in an accessible state where the security is cancelled (security unlock).

When the authentication of the user cannot be made even if the biometric authentication device 10 is worn on the wrist portion 14 of the user, and when the biometric authentication device 10 is removed from the wrist portion 14 of the user, the communication unit 138 transmits, to the external device 20, information necessary to set a logged-out state, to set the external device 20 to be in an inaccessible state where the security is set (security lock).

The reporting unit 134 reports a state of the biometric authentication device 10 (for example, ON/OFF of a power supply, ON/OFF of the authentication function, and the like) and information such as an authentication result.

The reporting unit 134 is configured from a display device such as a liquid crystal display (LCD) or an organic electro luminescence (EL), and an audio output device such as a buzzer.

When the wearing detection unit 135 is reported that the connection pin 18 and the wiring pattern 16a have been electrically connected in the wearing-detection connection terminal unit 19, the wearing detection unit 135 detects that the both ends of the band member 12 have been connected and the biometric authentication device 10 has been worn on the wrist portion 14, and outputs the detection result to the control unit 131.

Here, the wearing-detection connection terminal unit 19 includes the wiring pattern 15b formed on the flexible wiring board 15 and the connection pin 18 connected to the wiring pattern 15b, and the wiring pattern 16a formed on the flexible wiring board 16 and the through hole 17b connected to the wiring pattern 16a.

The control unit 131 starts biometric authentication processing in the biometric authentication unit 136 based on the detection result from the wearing detection unit 135.

The biological information acquisition unit 11 has a function provided in the band member 12 and to acquire the biological information of the user and output the biological information to the control unit 131, and includes the fingerprint sensor 11a, for example.

The fingerprint sensor 11a acquires the fingerprint data of the finger F of the user, the finger F being in contact with the detection surface.

The biometric authentication unit 136 performs the authentication of the user based on matching of the fingerprint data acquired in the biological information acquisition unit 11, and outputs an authentication result to the control unit 131.

The biometric authentication unit 136 further acquires the finger direction of the finger F of the user, the finger F being in contact with the detection surface, based on the fingerprint data of the finger F acquired by the fingerprint sensor 11a.

When the biometric authentication device 10 is removed from the wrist portion 14, the biometric authentication unit 136 performs the authentication of the user, including the determination of whether the finger direction of the finger F being in contact with the fingerprint sensor 11a is the same as the finger direction of the finger F at the time of an operation to wear the biometric authentication device 10 on the wrist portion 14, in addition to the matching of the fingerprint data.

Note that the finger direction of the finger F is acquired as follows. For example, a rotation angle with respect to the reference fingerprint, of when the fingerprint according to the fingerprint data of the finger F acquired by the fingerprint sensor 11a is rotated and matched with the reference fingerprint according to the reference fingerprint data stored in the authentication data storage unit 133 in the fingerprint matching, is acquired as the finger direction of the finger F.

Here, a value of the acquired rotation angle itself may be employed as the finger direction of the finger F of the user, or one rotation (360°) is divided into a plurality of sections such as 8 to 10 sections, and a section that includes the acquired rotation angle, of the plurality of sections, may be employed as the finger direction of the finger F.

Note that the method of acquiring the finger direction of the finger F is not limited to the system based on the fingerprint matching. For example, the biological information acquisition unit 11 may include a camera in addition to the fingerprint sensor 11a, and acquire the finger direction of the finger F with the camera.

The biometric authentication unit 136 may perform the authentication of the user, including the determination of the action data corresponding to the spatial movement of the biometric authentication device 10 acquired by the biological information acquisition unit 11, in addition to the matching of the fingerprint data acquired in the biological information acquisition unit 11, and the determination of the finger direction of the finger F. In this case, one of or both of the determination of the finger direction of the finger F and the determination of the action data may be performed.

Driving and Controlling Method of Embodiment

Hereinafter, a method of driving and controlling the biometric authentication device 10 according to the present embodiment illustrated in FIGS. 1 to 3 will be described in detail with reference to FIG. 4 illustrating an authentication operation in the present embodiment and the flowcharts of FIGS. 5 to 10 illustrating an operation of the wrist-type biometric authentication device 10 in the present embodiment.

(First Driving and Controlling Method)

First, a driving and controlling method of when the biometric authentication unit 136 performs the authentication of the user according to the matching of the fingerprint data and the determination of the finger direction of the finger F will be described with reference to the flowcharts of FIGS. 5 and 6.

Figure 5:
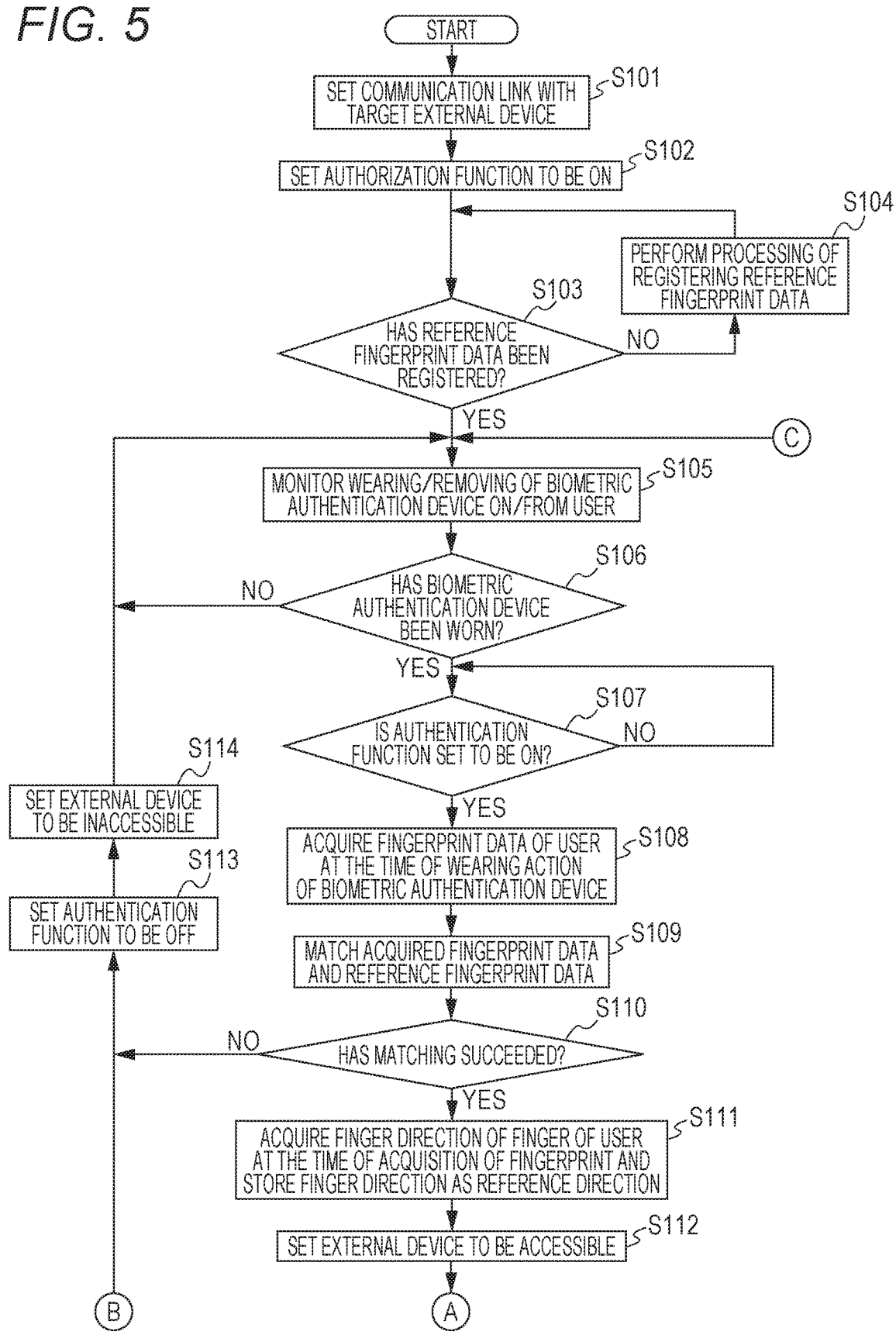
FIG. 5 is a flowchart (No. 1) illustrating an operation of a biometric authentication device according to an embodiment of the present invention.
Figure 6:
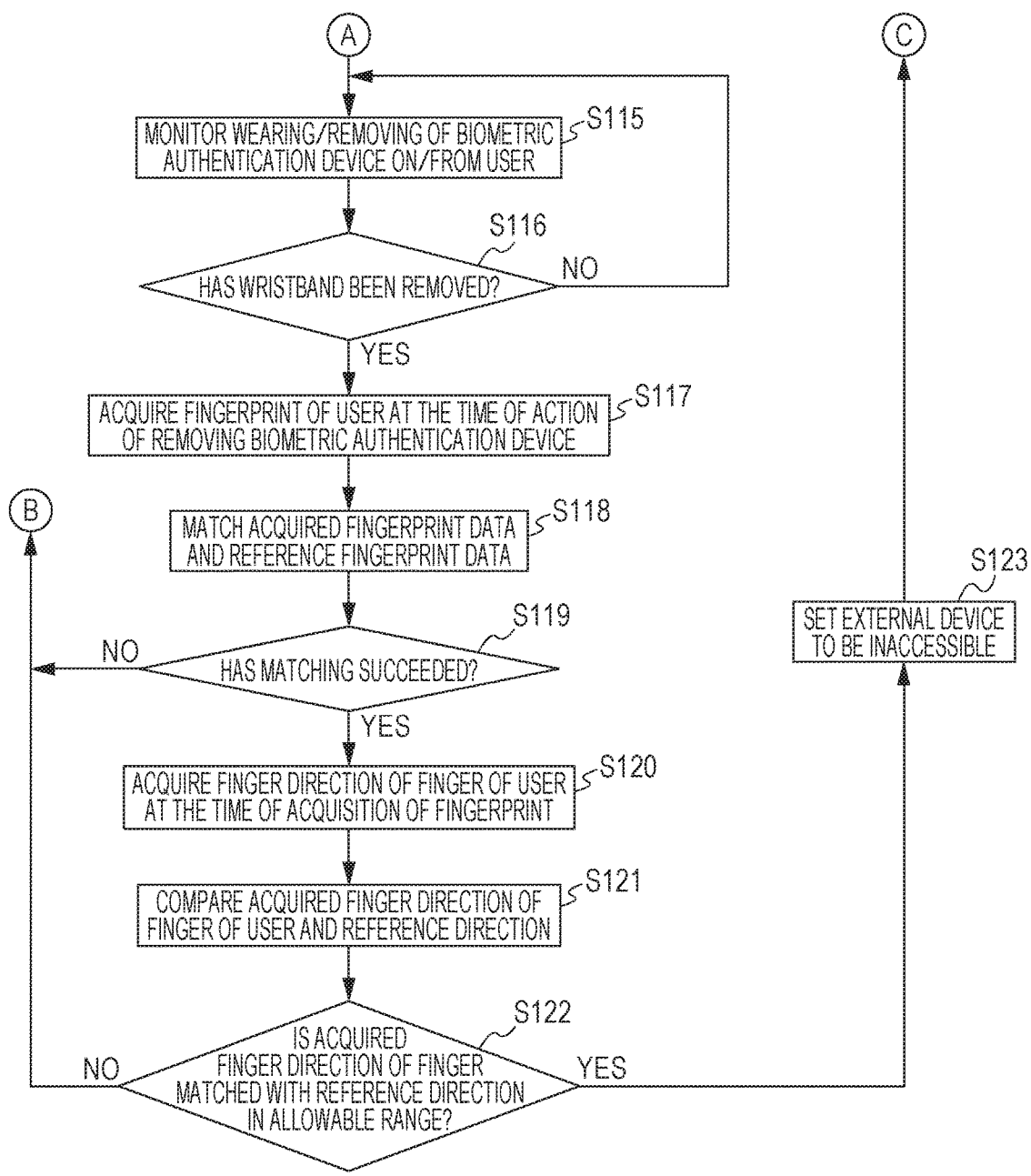
FIG. 6 is a flowchart (No. 2) illustrating an operation of a biometric authentication device according to an embodiment of the present invention.

As illustrated in FIG. 5, after the power supply is turned ON, the control unit 131 in the biometric authentication device 10 first sets the wired or wireless communication link with the external device 20 that is set as a target of communication, by the communication unit 138 (step S101). Next, the control unit 131 sets the authentication function to be ON (step S102).

Next, the control unit 131 determines whether the reference fingerprint data for performing the authentication of the user has already been registered in the authentication data storage unit 133 (step S103).

Here, when the reference fingerprint data is not registered in the authentication data storage unit 133 ("NO" in step S103), the control unit 131 performs processing of registering the reference fingerprint data to the authentication data storage unit 133 (step S104).

In the processing of registering the reference fingerprint data, the control unit 131 operates the fingerprint sensor 11a in the state where the user has the finger F be in contact with the detection surface of the fingerprint sensor 11a, and acquires the fingerprint data of a fingerprint 200 of the finger F as the reference fingerprint data.

In this case, the biometric authentication device 10 may be in a state of being worn on the wrist portion 14, or not worn on the wrist portion 14.

FIG. 4A illustrates an example of the reference fingerprint 200 according to the reference fingerprint data acquired by the fingerprint sensor 11a.

The biometric authentication unit 136 then extracts a plurality of characteristic points 201 such as intersection points of lines in the reference fingerprint 200, as illustrated in FIG. 4B, by a known technique, after acquiring the fingerprint data from the fingerprint sensor 11a.

The biometric authentication unit 136 stores (registers) the reference fingerprint data of the reference fingerprint 200 and data according to the plurality of characteristic points 201 to a predetermined area of the authentication data storage unit 133 as the reference fingerprint data.

Next, the control unit 131 monitors wearing/removal of the biometric authentication device 10 on/from the wrist portion 14 of the user by the wearing detection unit 135 (step S105).

The monitoring of the wearing/removal on/from the wrist portion 14 of the user is performed by monitoring the detection result as to whether the connection pin 18 and the wiring pattern 16a have been electrically connected by the wearing-detection connection terminal unit 19.

The control unit 131 then determines that the biometric authentication device 10 has been worn, when it has been determined that the connection pin 18 and the wiring pattern 16a have been electrically connected by the wearing-detection connection terminal unit 19 ("YES" in S106). Meanwhile, the control unit 131 determines that the biometric authentication device 10 is not worn ("NO" in step S106), when it has not been determined that the connection pin 18 and the wiring pattern 16a have been electrically connected by the wearing-detection connection terminal unit 19, and continues the monitoring of the wearing/removal of the biometric authentication device 10 on/from the wrist portion 14 of the user (step S105).

Next, when the biometric authentication device 10 has been determined to be worn on the wrist portion 14 of the user in step S106 ("YES" in step S106), the control unit 131 determines whether the authentication function is set to be ON (step S107).

Then, when the authentication function is set to be ON ("YES" in step S107), the control unit 131 acquires the fingerprint data corresponding to a fingerprint 300 of the finger F of the user, the finger F being in contact with the detection surface of the fingerprint sensor 11a at the time of an action to wear the biometric authentication device 10 on the wrist portion 14 of the user, by the fingerprint sensor 11a of the biological information acquisition unit 11 (step S108).

FIG. 4C illustrates an example of the fingerprint 300 according to the fingerprint data acquired by the fingerprint sensor 11a.

The biometric authentication unit 136 extracts a plurality of characteristic points 301 such as intersection points of lines in the fingerprint 300, by a known technique, after acquiring the fingerprint data of the fingerprint 300.

FIG. 4C illustrates the plurality of characteristic points 301 superimposed on the fingerprint 300 for convenience.

Following that, the biometric authentication unit 136 performs the fingerprint matching of the fingerprint 300 according to the fingerprint data acquired by the fingerprint sensor 11a of the biological information acquisition unit 11, and the reference fingerprint 200 according to the reference fingerprint data registered in the authentication data storage unit 133 (steps S109 and S110).

To be specific, as illustrated in FIG. 4D, in the fingerprint matching in step S109, the biometric authentication unit 136 performs the fingerprint matching by comparing positions of the plurality of characteristic points 301 in the fingerprint 300 and positions of the plurality of characteristic points 201 in the reference fingerprint 200.

In this case, the biometric authentication unit 136 rotates the fingerprint 300 on a plane with respect to the reference fingerprint 200, and searches for the rotation angle at which the characteristic points 301 and the characteristic points 201 are matched.

FIG. 4D illustrates a case in which the characteristic points 301 in the fingerprint 300 are matched with the positions of the characteristic points 201 in the reference fingerprint 200 when the fingerprint 300 is rotated in a left rotation direction by an angle θ.

When the fingerprint matching has been made and the authentication of the user can be made ("YES" in step S110), the control unit 131 employs the angle θ as the reference direction for the authentication of the user, and stores reference direction data corresponding thereto to a predetermined area in the authentication data storage unit 133 (step S111).

Here, the acquired rotation angle has been employed as the reference direction. However, for example, one rotation (360°) is divided into a plurality of sections such as 8 to 10 sections, and a section that includes the acquired rotation angle, of the plurality of sections, may be employed as the reference direction.

Next, the biometric authentication device 10 causes the communication unit 138 to transmit the information such as the identification information (ID) of the user and the like necessary to cancel the security lock to the external device 20, and sets the external device 20 to be in the accessible state where the security is cancelled (security unlock) (step S112).

The control unit 131 then returns to the monitoring of the wearing/removal of the biometric authentication device 10 on/from the wrist portion 14 of the user by the wearing detection unit 135 (step S105).

Meanwhile, when the characteristic points 301 are not matched with the characteristic points 201 in the reference fingerprint 200 even if the fingerprint 300 is rotated by one rotation (360°) in the fingerprint matching, the control unit 131 determines that the fingerprint matching cannot be made and the authentication of the user cannot be made ("NO" in step S110), and sets the authentication function to be OFF (step S113).

Next, the control unit 131 causes the communication unit 138 to transmit the information necessary to set the logged-out state to the external device 20, and sets the external device 20 to be in the inaccessible state where the security is set (security lock) (step S114).

When the authentication of the user has succeeded, after the external device 20 is set to be in the accessible state (step S112), the control unit 131 monitors the wearing/removal of the biometric authentication device 10 on/from the wrist portion 14 of the user by the wearing detection unit 135 (steps S115 and S116).

Next, in step S116, when the biometric authentication device 10 has been determined to be removed from the wrist portion 14 of the user ("YES" in step S116), the biometric authentication unit 136 acquires the fingerprint data corresponding to the fingerprint 300 of the finger F of the user, the finger F being in contact with the detection surface of the fingerprint sensor 11a at the time of an action to remove the biometric authentication device 10 from the wrist portion 14 of the user, by the fingerprint sensor 11a of the biological information acquisition unit 11 (step S117).

Following that, the biometric authentication unit 136 performs the fingerprint matching of the fingerprint 300 according to the fingerprint data acquired by the fingerprint sensor 11a of the biological information acquisition unit 11, and the reference fingerprint 200 according to the reference fingerprint data registered in the authentication data storage unit 133 (steps S118 and S119).

In the fingerprint matching in step S118, similarly to step S109, the biometric authentication unit 136 searches for the rotation angle at which the characteristic points 301 in the fingerprint 300 and the characteristic points 201 in the reference fingerprint 200 are matched.

When the fingerprint matching can be made, and the authentication of the user can be made, as described above ("YES" in step S119), the biometric authentication unit 136 acquires the rotation angle at which the characteristic points 301 in the fingerprint 300 and the characteristic points 201 in the reference fingerprint 200 are matched, as the finger direction of the finger F of the user (step S120).

Here, when the fingerprint matching cannot be made, and the authentication of the user cannot be made ("NO" in step S119), the control unit 131 sets the authentication function to be OFF (step S113).

Next, the control unit 131 causes the communication unit 138 to transmit the information necessary to set the logged-out state to the external device 20, and sets the external device 20 to be in the inaccessible state where the security is set (security lock), (step S114), and returns to the monitoring of the wearing/removal of the biometric authentication device 10 on/from the wrist portion 14 of the user by the wearing detection unit 135 (step S105).

When the fingerprint matching can be made, and the authentication of the user can be made, after the finger direction of the finger F in which the characteristic points 301 in the fingerprint 300 and the characteristic points 201 in the reference fingerprint 200 are matched is acquired, the biometric authentication unit 136 compares the acquired finger direction of the finger F of the user, and the reference direction according to the reference direction data corresponding to the finger direction of the finger F of the user at the time of wearing the biometric authentication device 10 on the wrist portion 14 of the user, stored in the authentication data storage unit 133 (steps S121 and S122).

When the acquired finger direction of the finger F of the user has been determined to be matched with the reference direction in a predetermined allowable range in the biometric authentication unit 136 ("YES" in step S122), the control unit 131 causes the communication unit 138 to transmit the information necessary to set the logged-out state, to the external device 20, and sets the external device 20 to be in the inaccessible state where the security is set (security lock) (step S123).

Then, the control unit 131 returns to the monitoring of the wearing/removal of the biometric authentication device 10 on/from the wrist portion 14 of the user by the wearing detection unit 135 (step S105).

Meanwhile, when the finger direction of the finger F of the user has been determined to be different from the reference direction, beyond the allowable range ("NO" in step S122), the control unit 131 sets the authentication function to be OFF (step S113).

Next, the control unit 131 causes the communication unit 138 to transmit the information necessary to set the logged-out state to the external device 20, and sets the external device 20 to be the inaccessible state where the security is set (security lock) (step S114).

The control unit 131 then returns to the monitoring of the wearing/removal of the biometric authentication device 10 on/from the wrist portion 14 of the user by the wearing detection unit 135 (step S105).

In the present embodiment, when the fingerprint matching for the fingerprint of the user at the time of wearing the biometric authentication device 10 on the wrist portion 14 of the user, and of removing the biometric authentication device 10 from the wrist portion 14 of the user cannot be made, the authentication function of the biometric authentication device 10 is set to be OFF, and after that, the fingerprint matching by the biometric authentication device 10 cannot be performed. In addition to that, when the finger direction of the finger F of the user, the finger F being in contact with the fingerprint sensor 11a, at the time of wearing the biometric authentication device 10 on the wrist portion 14 of the user, and the finger direction of the finger F of the user, the finger F being in contact with the fingerprint sensor 11a when the biometric authentication device 10 is removed from the wrist portion 14 of the user are further compared and the finger directions are not matched, the authentication function of the biometric authentication device 10 is set to be OFF, and after that, the fingerprint matching by the biometric authentication device 10 cannot be performed.

Here, the finger direction of the finger F of the user, the finger F being in contact with the fingerprint sensor 11a at the time of wearing the biometric authentication device 10 on the wrist portion 14 of the user is information known by the user only. Furthermore, the finger direction can be differentiated every time the biometric authentication device 10 is worn on the wrist portion 14 of the user. Therefore, for example, even if the fingerprint matching can be made using copying of the fingerprint, it is difficult to match the finger direction of the finger.

That is, for example, when another person removes the biometric authentication device 10 worn by the user, using copying of the fingerprint, even if, for example, the fingerprint matching can be made by the copying of the fingerprint, the authentication function of the biometric authentication device 10 is set to OFF if the finger direction of the finger is different from the finger direction of the finger at the time of wearing the device, and cannot access the external device.

Accordingly, the security can be enhanced, compared with the case of using the fingerprint matching only.

Even if the user himself/herself uses the biometric authentication device 10, when the finger direction of the finger F to the fingerprint sensor 11a of when the biometric authentication device 10 is removed from the wrist portion 14 of the user is wrongly changed from the finger direction at the time of wearing the biometric authentication device 10, the authentication function of the biometric authentication device 10 is also set to be OFF, and cannot access the external device.

In this case, for example, the user authentication is performed at the side of the external device 20, and processing of setting the authentication function of the biometric authentication device 10 to be ON is performed.

FIG. 11 illustrates a setting processing operation in the external device 20.

In the setting processing operation, first, the user inputs identification confirmation information such as a user ID and a password to the external device 20, as illustrated in FIG. 11 (step S401).

Next, the external device 20 performs user authentication based on the input identification confirmation information (steps S401 and S403).

Then, when the user authentication has been completed ("YES" in step S403), the external device 20 performs communication with the biometric authentication device 10, and sets the authentication function of the biometric authentication device 10 to be ON (step S404).

Meanwhile, when the user authentication cannot be made ("NO" in step S403), no setting to the biometric authentication device 10 is performed.

(Second Driving and Controlling Method)

Figure 7:
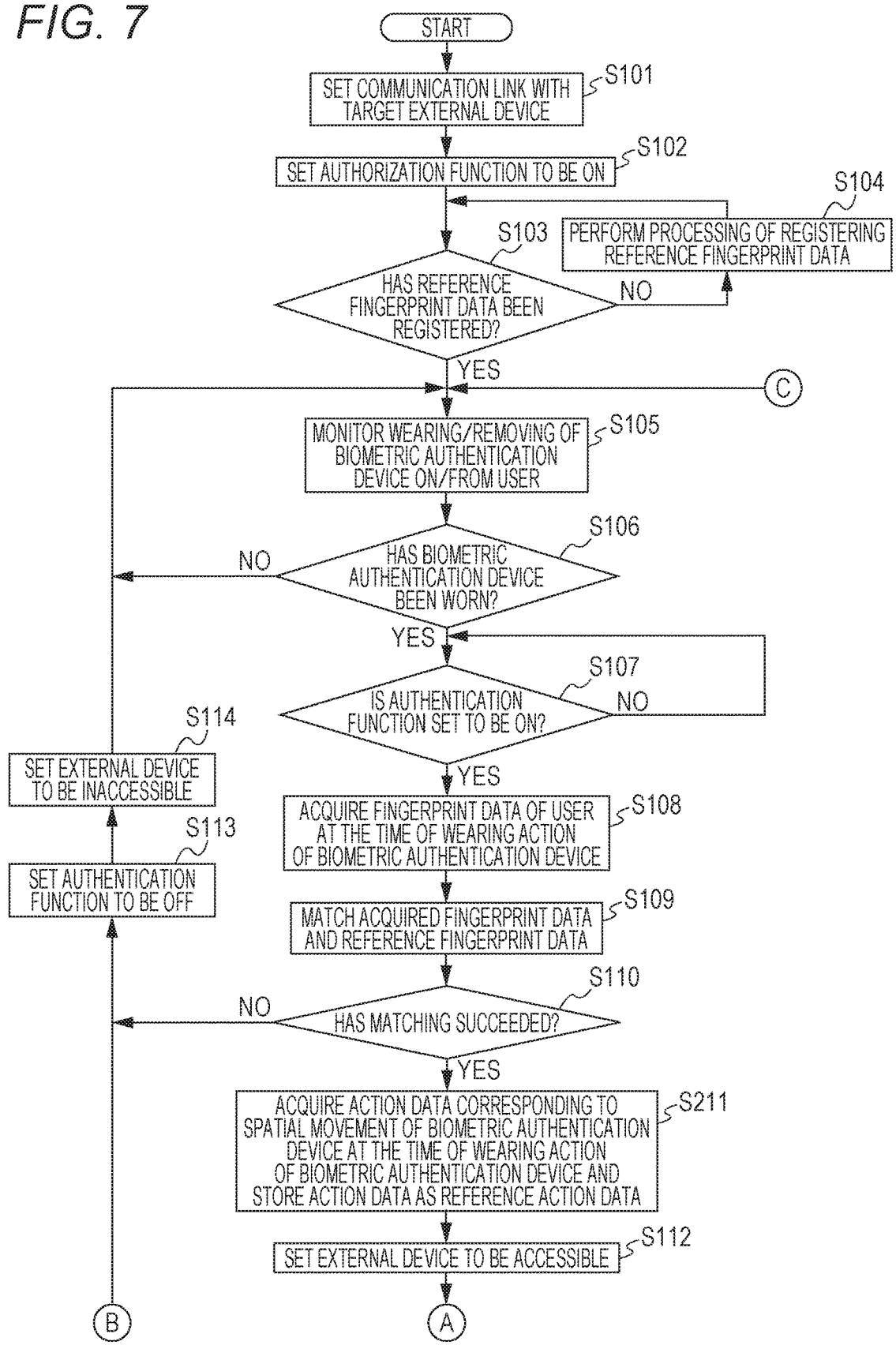
FIG. 7 is a flowchart (No. 3) illustrating an operation of a biometric authentication device according to an embodiment of the present invention.
Figure 8:
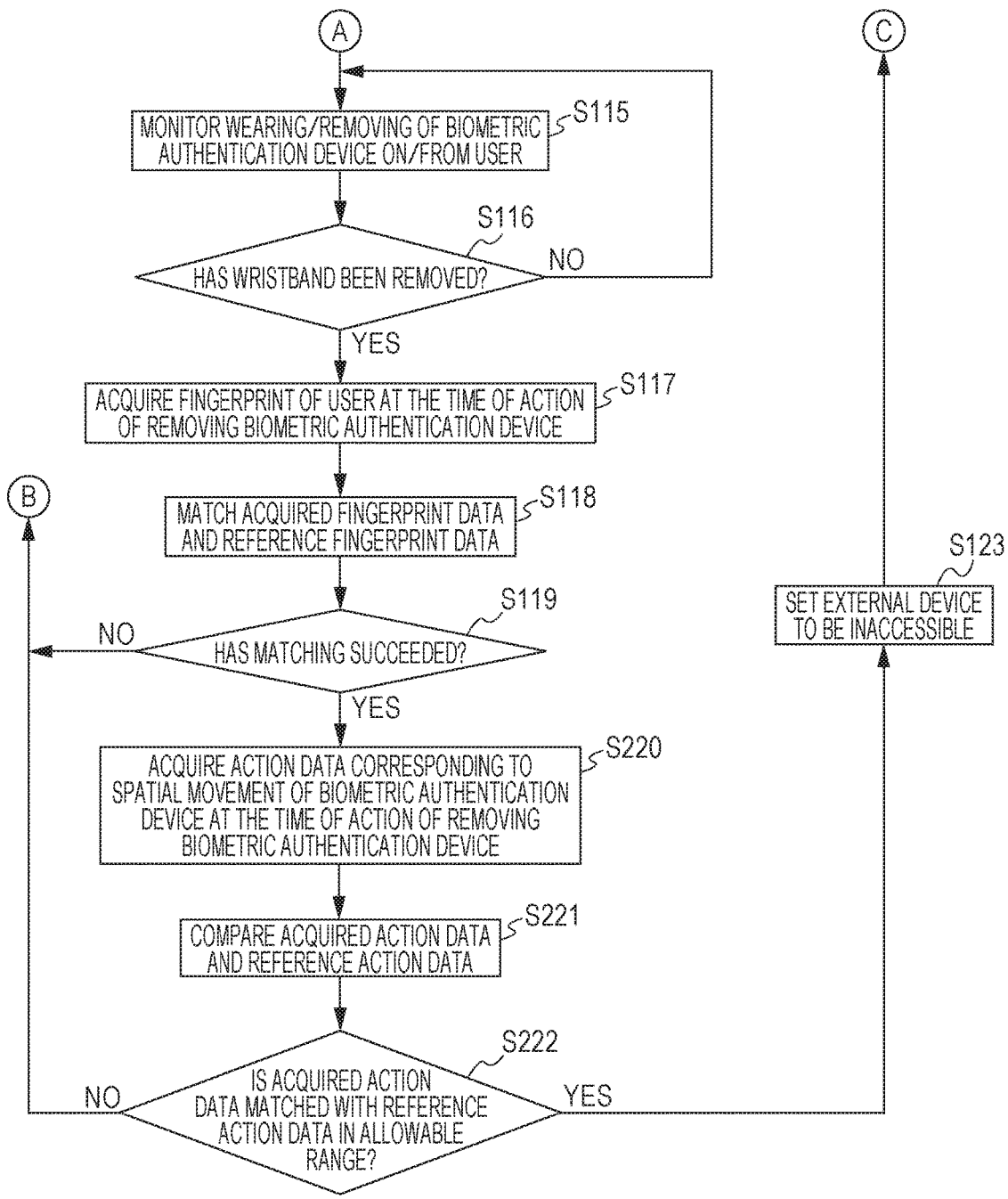
FIG. 8 is a flowchart (No. 4) illustrating an operation of a biometric authentication device according to an embodiment of the present invention.

Next, a driving and controlling method of when the biometric authentication unit 136 performs the authentication of the user according to the matching of the fingerprint data and the determination of the action data will be described with reference to the flowcharts of FIGS. 7 and 8.

Here, portions different from the above-described first driving and controlling method will be mainly described, and description of portions similar to the first driving and controlling method is simplified or omitted.

When the biometric authentication device 10 has been determined to be worn on the wrist portion 14 of the user ("YES" in step S106), and the authentication function is set to be ON ("YES" in step S107), the biometric authentication unit 136 performs the fingerprint matching of the fingerprint 300 according to the fingerprint data acquired by the fingerprint sensor 11a of the biological information acquisition unit 11, and the reference fingerprint 200 according to the reference fingerprint data registered in the authentication data storage unit 133 (steps S109 and S110).

Then, when the fingerprint matching can be made and the authentication of the user can be made ("YES" in step S110), the biological information acquisition unit 11 acquires the action data corresponding to the spatial movement of the biometric authentication device 10 due to movement of the wearing portion of the wrist portion 14 where the biometric authentication device 10 is worn, the movement having been performed by the user when wearing the biometric authentication device 10 on the wrist portion 14. Then, the biological information acquisition unit 11 stores the acquired action data to a predetermined area of the authentication data storage unit 133 as the reference action data (step S211).

Next, when the biometric authentication device 10 has been determined to be removed from the wrist portion 14 of the user ("YES" in step S116), the biometric authentication unit 136 performs the fingerprint matching of the fingerprint 300 according to the acquired fingerprint data, and the reference fingerprint 200 according to the reference fingerprint data registered in the authentication data storage unit 133 (steps S118 and S119).

Then, when the fingerprint matching can be made and the authentication of the user can be made ("YES" in step S119), the biological information acquisition unit 11 acquires the action data corresponding to the spatial movement of the biometric authentication device 10 due to the movement of the wearing portion of the wrist portion 14 where the biometric authentication device 10 is worn, the movement having been performed by the user when removing the biometric authentication device 10 from the wrist portion 14 (step S220).

Next, the biometric authentication unit 136 compares the action data acquired in step S220 and the reference action data stored in the authentication data storage unit 133 (step S221).

Then, when the action data acquired in step S220 has been determined to be matched with the reference action data in a predetermined allowable range in the biometric authentication unit 136 ("YES" in step S222), the control unit 131 causes the communication unit 138 to transmit the necessary information to set the logged-out state to the external device 20, and sets the external device 20 to be in the inaccessible state where the security is set (security lock) (step S123).

Meanwhile, when the action data acquired in step S220 has been determined to be different from the reference action data, beyond the allowable range ("NO" in step S222), the control unit 131 sets the authentication function to be OFF (step S113).

(Third Driving and Controlling Method)

Figure 9:
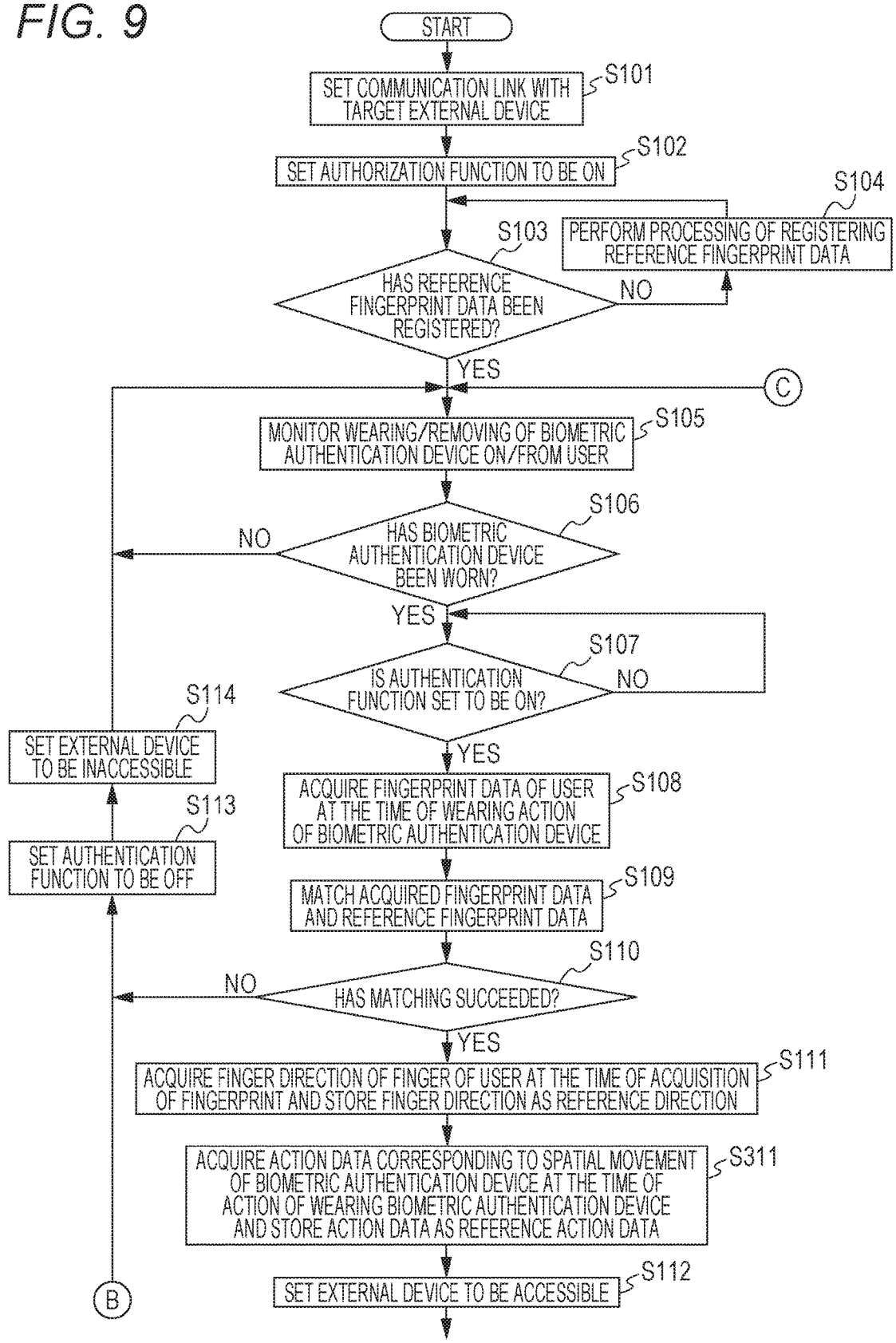
FIG. 9 is a flowchart (No. 5) illustrating an operation of a biometric authentication device according to an embodiment of the present invention.
Figure 10:
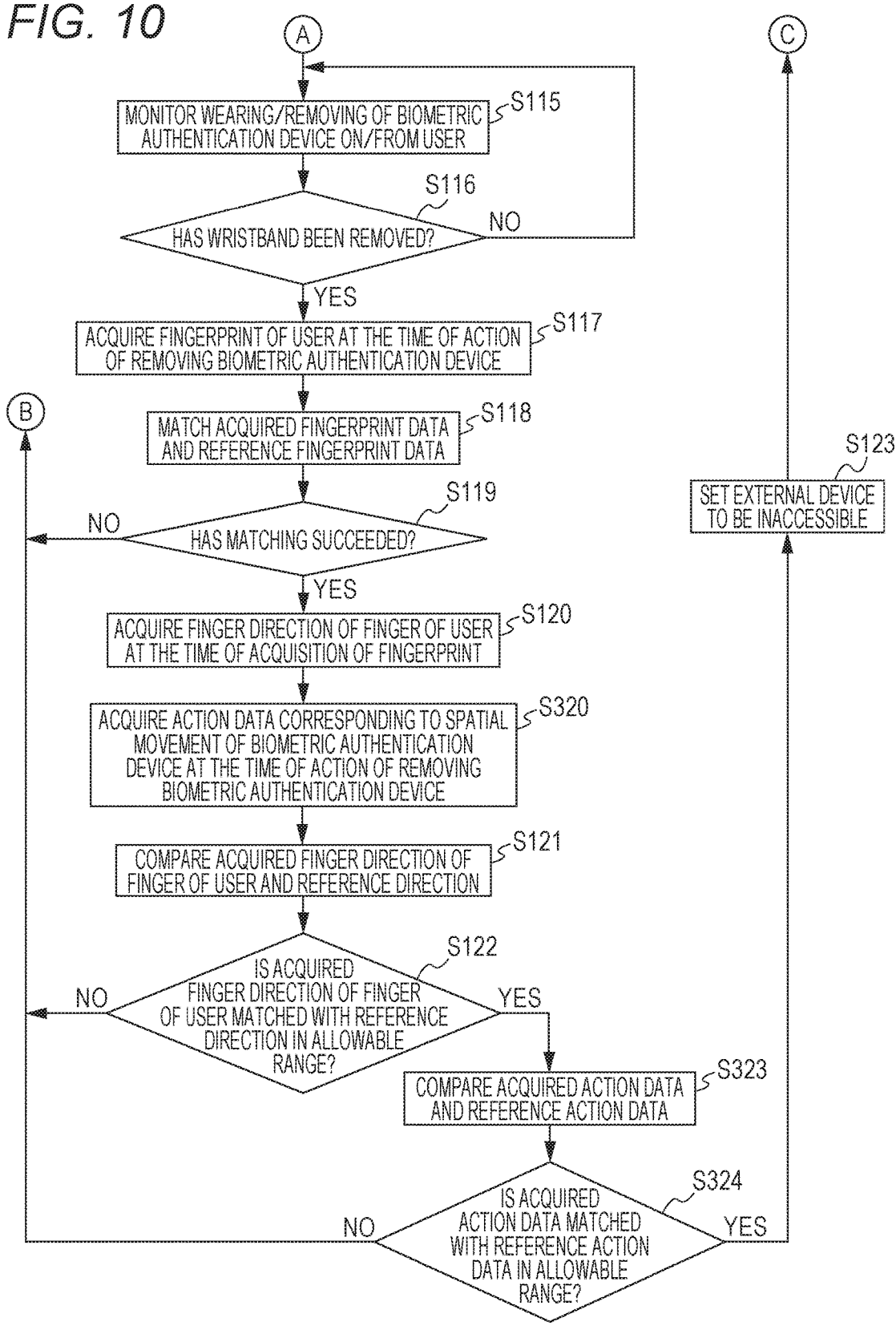
FIG. 10 is a flowchart (No. 6) illustrating an operation of a biometric authentication device according to an embodiment of the present invention.

Next, a driving and controlling method of when the biometric authentication unit 136 performs the authentication of the user according to the matching of the fingerprint data, the determination of the finger direction of the finger F, and the determination of the action data will be described with reference to the flowcharts of FIGS. 9 and 10.

Here, portions different from the above-described first and second driving and controlling methods will be mainly described, and description of portions similar to the first and second driving and controlling methods is simplified or omitted.

When the biometric authentication device 10 has been determined to be worn on the wrist portion 14 of the user ("YES" in step S106), and the authentication function is set to be ON ("YES" in step S107), the biometric authentication unit 136 performs the fingerprint matching of the fingerprint 300 according to the fingerprint data acquired by the fingerprint sensor 11a of the biological information acquisition unit 11, and the reference fingerprint 200 according to the reference fingerprint data registered in the authentication data storage unit 133 (steps S109 and S110).

Then, when the fingerprint matching can be made and the authentication of the user can be made ("YES" in step S110), the control unit 131 employs the angle θ as the reference direction for the authentication of the user, and stores the reference direction data corresponding thereto to the predetermined area of the authentication data storage unit 133 (step S111).

Next, the biological information acquisition unit 11 acquires the action data corresponding to the spatial movement of the biometric authentication device 10 due to movement of the wearing portion of the wrist portion 14 where the biometric authentication device 10 is worn, the movement having been performed by the user when wearing the biometric authentication device 10 on the wrist portion 14. Then, the biological information acquisition unit 11 stores the acquired action data to the predetermined area of the authentication data storage unit 133 as the reference action data (step S311).

Next, when the biometric authentication device 10 has been determined to be removed from the wrist portion 14 of the user ("YES" in step S116), the biometric authentication unit 136 performs the fingerprint matching of the fingerprint 300 according to the acquired fingerprint data, and the reference fingerprint 200 according to the reference fingerprint data registered in the authentication data storage unit 133 (steps S118 and S119).

Then, when the fingerprint matching can be made and the authentication of the user can be made ("YES" in step S119), the biometric authentication unit 136 acquires the rotation angle at which the characteristic points 301 in the fingerprint 300 and the characteristic points 201 in the reference fingerprint 200 are matched, as the finger direction of the finger F of the user (step S120).

Next, the biological information acquisition unit 11 acquires the action data corresponding to the spatial movement of the biometric authentication device 10 due to movement of the wearing portion of the wrist portion 14 where the biometric authentication device 10 is worn, the movement having been performed by the user when removing the biometric authentication device 10 from the wrist portion 14 (step S320).

Next, the biometric authentication unit 136 compares the acquired finger direction of the finger F of the user, and the reference direction according to the reference direction data corresponding to the finger direction of the finger F of the user at the time of wearing the biometric authentication device 10 on the wrist portion 14 of the user, stored in the authentication data storage unit 133 (step S121, step S122).

Then, when the biometric authentication unit 136 has determined that the acquired finger direction of the finger F of the user is different from the reference direction, beyond the allowable range ("NO" in step S122), the control unit 131 sets the authentication function to be OFF (step S113).

Meanwhile, when the biometric authentication unit 136 has determined that the acquired finger direction of the finger F of the user is matched with the reference direction in the predetermined allowable range ("YES" in step S122), the biometric authentication unit 136 compares the action data acquired in step S320 and the reference action data stored in the authentication data storage unit 133 (steps S323 and S324).

Then, when the biometric authentication unit 136 has determined that the action data acquired in step S320 is matched with the reference action data in the predetermined allowable range ("YES" in step S324), the control unit 131 causes the communication unit 138 to transmit the information necessary to set the logged-out state to the external device 20, and sets the external device 20 to be in the inaccessible state where the security is set (security lock) (step S123).

Meanwhile, when the biometric authentication unit 136 has determined that the action data acquired in step S320 is different from the reference action data, beyond the allowable range ("NO" in step S324), the control unit 131 sets the authentication function to be OFF (step S113).

(Modification)

In the above embodiments, the biological information acquisition unit 11 includes the fingerprint sensor 11a. However, the biological information acquisition unit 11 may further include a configuration to acquire a biological impedance of a user. Then, a value of the biological impedance can be used for authentication of the user, in addition to fingerprint matching.

Figure 12A:
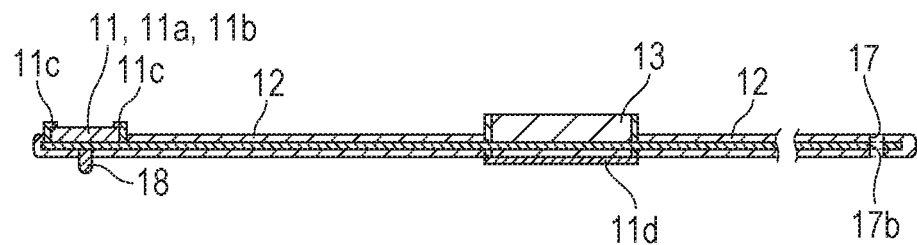
FIGS. 12A to 12C are diagrams illustrating a first modification of a biometric authentication device according to an embodiment of the present invention.
Figure 12B:
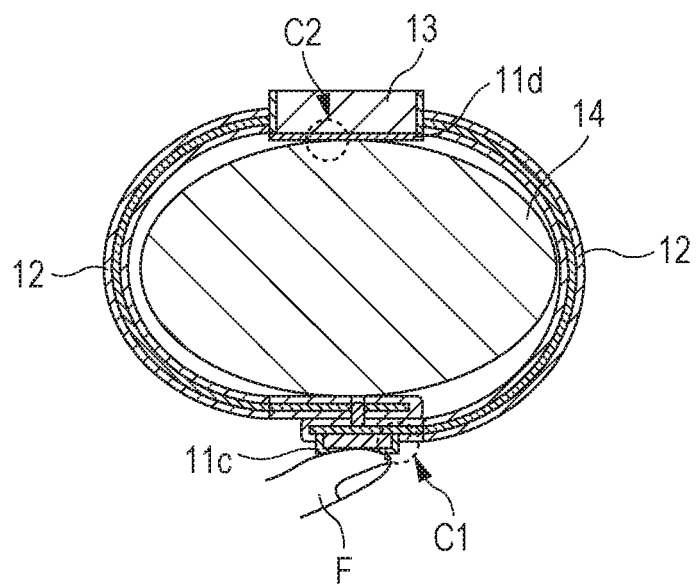
Figure 12C:
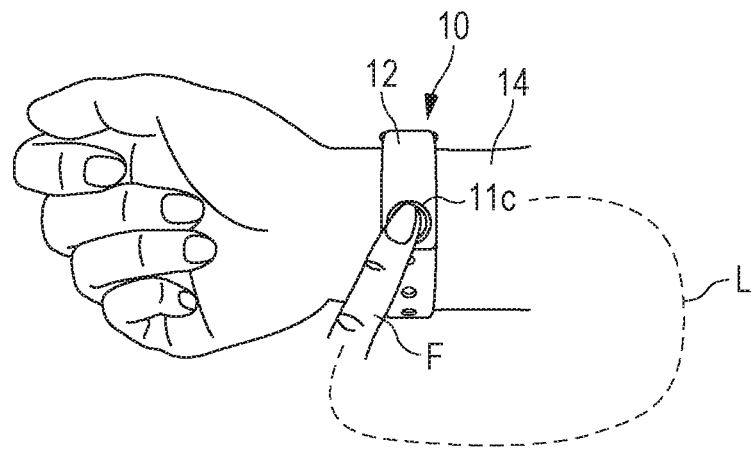

An example of a configuration of this case will be illustrated in FIGS. 12A, 12B, and 12C.

That is, as illustrated in FIGS. 12A and 12B, a biological information acquisition unit 11 includes a pair of first and second electrodes 11c and 11d, for acquiring a biological impedance of a user.

The first electrode 11c is provided around a fingerprint sensor 11a, and its upper end protrudes upward and is exposed, and is electrically connected with a circuit in a main body unit 13 with wiring (not illustrated). Then, when a finger F of the user comes in contact with a detection surface of the fingerprint sensor 11a, at the time of wearing or removing a biometric authentication device 10, a part of the finger F comes in contact with the first electrode 11c.

The second electrode 11d is provided on a back surface side of the main body unit 13, and a surface on the back surface side is exposed, and is electrically connected with a circuit in the main body unit 13 with wiring (not illustrated). Then, as illustrated in FIG. 12B, when the biometric authentication device 10 is wound around a wrist portion 14 of the user and is worn, the surface of the second electrode 11d at the back surface side comes in contact with the wrist portion 14.

Then, as illustrated in FIGS. 12B and 12C, when the biometric authentication device 10 is wound around the wrist portion 14 of the user, and the finger F of the user comes in contact with the detection surface of the fingerprint sensor 11a, a conduction path L is formed between the finger F being in contact with the first electrode 11c and the wrist portion 14 being in contact with the second electrode 11d through both arms and a body of the user.

At this time, when a voltage is applied between the first electrode 11c and the second electrode 11d with the circuit in the main body unit 13, a current flows in the conduction path L. By measuring a current value of the current, the biological impedance of the user can be acquired. A value of the biological impedance differs depending on the user. Therefore, this can be used for the authentication of the user.

The biological information acquisition unit 11 may further include a sensor that acquires a vein pattern of the user.

In the above embodiments, the wiring pattern 16a formed on the flexible wiring board 16 is commonly connected to the plurality of through holes 17b, and does not detect in which the plurality of through holes 17a, 17b, and 17c the connection pin 18 is fit.

However, an embodiment is not limited thereto, and for example, a wearing detection unit 135 may be configured to detect in which a plurality of through holes 17a, 17b, and 17c a connection pin 18 is fit.

Figure 13:
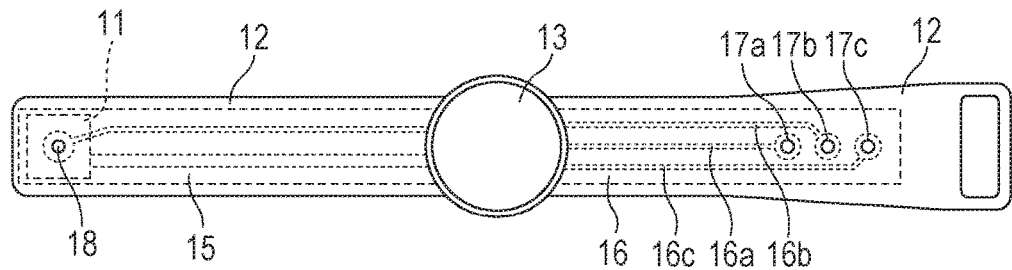
FIG. 13 is a diagram illustrating a second modification of a biometric authentication device according to an embodiment of the present invention.

An example of a configuration of this case will be illustrated in FIG. 13. That is, when three through holes 17a, 17b, and 17c are included, a main body unit 13 and the through hole 17a are connected with a wiring pattern 16a, the main body unit 13 and the through hole 17b are connected with a wiring pattern 16b, and the main body unit 13 and the through hole 17c are connected with a wiring pattern 16c. Then, the wearing detection unit 135 can detect in which the plurality of through holes 17a, 17b, and 17c the connection pin 18 is fit.

In this case, a detection result of in which the plurality of through holes 17a, 17b, and 17c the connection pin 18 being fit may be used in the authentication of the user, in addition to the fingerprint matching.

That is, for example, when the connection pin 18 is fit in the through hole 17a when the user himself/herself uses the biometric authentication device 10, it can be determined that another person who is not the user himself/herself uses the biometric authentication device 10, when the connection pin 18 is fit into the through hole 17b and the biometric authentication device 10 is used.

As described above, the authentication is performed including the biological impedance and the vein pattern of the user, and further the position of the through hole in which the connection pin 18 is fit, without depending only on the fingerprint data as the biological information, whereby the accuracy of the biometric authentication can be further improved.

Further, when the biological information acquisition unit 11 includes an acceleration sensor as the motion sensor 11b, the transmission of the information necessary to cancel the security lock such as the ID may be prohibited even if the authentication is established, when a value of the acceleration measured by the acceleration sensor is larger than a predetermined value. Accordingly, more flexible control of the external device becomes possible.

Effects of Embodiment

As described above, the biometric authentication device 10 according to the present embodiment includes the biological information acquisition unit 11 provided in the band member 12 and which acquires the biological information of the user, and the biometric authentication unit 136 that performs authentication of the user, based on the acquired biological information.

Further, the biological information acquisition unit 11 is configured to be able to acquire the fingerprint data of the user as the biological information and acquire the finger direction of the finger having been in touch with the fingerprint sensor, and use the finger direction of the finger for the authentication of the user, in addition to the fingerprint matching.

Further, the biological information acquisition unit 11 is configured to be able to acquire the action data corresponding to the movement of the biometric authentication device 10, due to the movement of the wearing portion of the biometric authentication device 10 in the user of when the biometric authentication device 10 is worn by the user or removed from the user, and use to the action data for the authentication of the user.

The finger direction of the finger and how to move the wearing portion are information that is known only by the user, and can be dynamically attached. Therefore, unauthorized use by copying of the fingerprint and the like can be favorably eliminated, compared with a case of using only the fingerprint matching, and enhancement of the security can be achieved.

The present invention was described using the embodiments. However, it is apparent that the technical scope of the present invention is not limited to the scope described in the above embodiments.

It is apparent for a person skilled in the art that various changes and modifications can be added to the embodiments.

It is apparent that such embodiments to which the changes and modifications are added are also included in the technical scope of the present invention from the description of claims.

What is claimed is:

1. A biometric authentication device comprising:
a structure member which is wearable by a user,
a biological information acquisition unit, mounted on the structure member, configured to acquire biological information of the user, wherein the biological information includes first biological information and second biological information; and
a biometric authentication unit configured to perform authentication of the user, wherein:
the biological information acquisition unit is provided in a position where a finger of the user is in contact when the structure member is donned by the user or the structure member is removed from the user,
the biological information acquisition unit acquires, as the first biological information, information of a fingerprint or a vein of the finger of the user in contact with the biological information acquisition unit when the structure member is donned by the user or when the structure member is removed from the user, and acquires, from the first biological information, a direction of the finger with respect to the biological information acquisition unit when the finger comes in contact with the biological information acquisition unit, as the second biological information, and
the biometric authentication unit performs the authentication based on a comparison between the second biological information acquired by the biological information acquisition unit and second biological information previously acquired by the biological information acquisition unit.

2. The biometric authentication device according to claim 1, wherein:
the biological information acquisition unit:
acquires a first finger direction of the finger in contact with the biological information acquisition unit at a first operation time when the structure member is donned by the user, as the second biological information, and
acquires a second finger direction of the finger in contact with the biological information acquisition unit at a second operation time when the structure member is removed from the user, as the second biological information, and
the biometric authentication unit:
performs the authentication based on matching of the first biological information and reference biological information stored in advance at the first operation time, and
performs the authentication based on the matching of the first biological information and the reference biological information, and a comparison between the first finger direction and the second finger direction at the second operation time.

3. The biometric authentication device according to claim 2, wherein the biometric authentication unit controls at least the biological information acquisition unit to be inoperable, when the authentication has ended in failure at the first operation time, or when the authentication has ended in failure at the second operation time.

4. The biometric authentication device according to claim 2, wherein the biological information acquisition unit:
    acquires first operation-time biological information with the finger of the user in contact with the biological information acquisition unit at the first operation time, as the first biological information,
    acquires the first finger direction based on the first operation-time biological information,
    acquires second operation-time biological information with the finger of the user in contact with the biological information acquisition unit at the second operation time, as the first biological information, and
    acquires the second finger direction based on the second operation-time biological information.

5. The biometric authentication device according to claim 2, wherein the biometric authentication unit recognizes that the authentication ends in failure and controls at least the biological information acquisition unit to be inoperable, when at least a difference between the first finger direction and the second finger direction exceeds a predetermined allowable range at the second operation time.

6. The biometric authentication device according to claim 1, wherein:
    the biological information acquisition unit further acquires, as the second biological information, (i) first action data corresponding to spatial movement of the biometric authentication device at a first operation time when the structure member is donned by the user, and (ii) second action data corresponding to spatial movement of the biometric authentication device at a second operation time when the structure member is removed from the user, and
    the biometric authentication unit performs the authentication based on matching of the first biological information and comparison between the first action data and the second action data at the second operation time.

7. The biometric authentication device according to claim 1, further comprising:
    a communication unit configured to be able to mutually perform communication with an external device set in advance,
    wherein:
    the communication unit transmits information for setting the external device to be inaccessible to set the external device to be inaccessible when the authentication in the biometric authentication unit ends in failure, and
    the communication unit transmits information for setting the external device to be accessible to set the external device to be accessible when the authentication in the biometric authentication unit has succeeded.

8. The biometric authentication device according to claim 1, wherein:
    the structure member includes a band member on which the biological information acquisition unit is provided, the band member having a first end portion and a second end portion at respective ends thereof in a length direction, the band member being configured to be wound around a wearing portion of the user when the structure member is worn by the user, and the band member having the first end portion and the second end portion electrically connected when the band member is wound around the wearing portion, and
    the biometric authentication device further comprises a wearing detection unit configured to electrically detect whether the first end portion and the second end portion of the band member have been connected, wherein an acquisition action of the biological information of the biological information acquisition unit is controlled according to a detection result by the wearing detection unit.

9. The biometric authentication device according to claim 8, wherein:
    the band member has a structure in which the first end portion is connectable with the second end portion at a plurality of mutually different positions,
    the wearing detection unit detects a connection position as to where in the second end portion the first end portion of the band member is connected, and
    the biometric authentication unit performs the authentication based on a detection result of the connection position by the wearing detection unit.

10. The biometric authentication device according to claim 1, wherein:
    the structure member has a structure which is wearable on a wrist or an arm of the user,
    the biological information acquisition unit includes a first electrode provided in a position where the finger of the user is in contact, and a second electrode provided in a position where the wrist or the arm of the user is in contact, and
    the biological information acquisition unit further acquires a biological impedance of the user with the first electrode and the second electrode, and
    the biometric authentication unit performs the authentication based on a value of the biological impedance.

11. The biometric authentication device according to claim 10, wherein the first electrode in the biological information acquisition unit is provided at a position where a specific finger is in contact when the structure member is donned by the user or the structure member is removed from the user, and the biological information acquisition unit acquires the biological impedance in parallel with acquisition of the first biological information with the specific finger.

12. A method of driving and controlling a biometric authentication device, the biometric authentication device comprising a structure member which is wearable by a user, and a biological information acquisition unit, mounted on the structure member, in a position where a finger of the user is in contact when the structure member is donned by the user or the structure member is removed from the user, the method comprising:
    acquiring biological information of the user, wherein the biological information includes first biological information and second biological information; and
    performing authentication of the user,
    wherein:
    said acquiring the biological information includes:
        acquiring, as the first biological information, information of a fingerprint or a vein of the finger of the user in contact with the biological information acquisition unit when the structure member is donned by the user or the structure member is removed from the user, and
        acquiring, from the first biological information, a direction of the finger with respect to the biological information acquisition unit when the finger comes in contact with the biological information acquisition unit, as the second biological information, and
the authentication is performed based on a comparison between the second biological information acquired by the biological information acquisition unit and second biological information previously acquired by the biological information acquisition unit.

13. The method of driving and controlling a biometric authentication device according to claim 12, wherein:
said acquiring the biological information includes:
acquiring a first finger direction of the finger in contact with the biometric authentication device at a first operation time when the structure member is donned by the user, as the second biological information, and
acquiring a second finger direction of the finger in contact with the biometric authentication device at a second operation time when the structure member is removed from the user, as the second biological information, and
said performing the authentication includes:
performing a first authentication based on matching of the first biological information and reference biological information stored in advance at the first operation time, and
performing a second authentication based on the matching of the first biological information and the reference biological information, and comparison between the first finger direction and the second finger direction at the second operation time.

14. The method of driving and controlling a biometric authentication device according to 13, the method further comprising:
controlling at least a function to acquire the biological information in the biometric authentication device to be inoperable, when the authentication has ended in failure in the performing of the authentication at the first operation time, or when the authentication has ended in failure in the performing of the authentication at the second operation time.

15. The method of driving and controlling a biometric authentication device according to 13, wherein:
acquiring the biological information includes:
acquiring first operation-time biological information with the finger of the user in contact with the biometric authentication device, at the first operation time, as the first biological information, and
acquiring second operation-time biological information with the finger of the user in contact with the biometric authentication device, at the second operation time, as the first biological information,
the first finger direction is acquired based on the first operation-time biological information, and
the second finger direction is acquired based on the second operation-time biological information.

16. The method of driving and controlling a biometric authentication device according to claim 13, wherein:
in the second authentication, it is recognized that the authentication ends in failure, when at least a difference between the first finger direction and the second finger direction exceeds a predetermined allowable range at the second operation time, and
the method further comprises:
controlling at least an operation of a function to acquire the biological information in the biometric authentication device to be inoperable, when the authentication has ended in failure in the second authentication.

17. The method of driving and controlling a biometric authentication device according to claim 12, wherein:
said acquiring the second biological information further includes:
acquiring first action data corresponding to spatial movement of the biometric authentication device at a first operation time when the structure member is donned by the user, as the second biological information, and
acquiring second action data corresponding to the spatial movement of the biometric authentication device at a second operation time when the structure member is removed from the user, as the second biological information, and
said performing the authentication further comprises performing the authentication based on matching of the first biological information and a comparison of the first action data and the second action data at the second operation time.

18. The method of driving and controlling a biometric authentication device according to claim 12, wherein:
the structure member includes a band member on which the biological information acquisition unit is provided, the band member having a first end portion and a second end portion at respective ends thereof in a length direction, the band member being configured to be wound around a wearing portion of the user when the structure member is worn to the user, and the band member having the first end portion and the second end portion electrically connected when the band member is wound around the wearing portion, and
the method further comprises:
electrically detecting whether the first end portion and the second end portion of the band member have been connected; and
controlling an acquisition action of the biological information according to a detection result of the detecting of the connection.

19. The method of driving and controlling a biometric authentication device according to claim 18, wherein:
the band member has a structure in which the first end portion is connectable with the second end portion at a plurality of mutually different positions,
the detecting of the connection includes detecting a connection position as to where in the second end portion the first end portion of the band member is connected, and
said performing of the authentication comprises using a detection result of the connection position of the first end portion in the second end portion of the one end portion of the band member.

20. The method of driving and controlling a biometric authentication device according to claim 12, wherein:
the biometric authentication device includes an electrode for acquiring a biological impedance of the user,
said acquiring the biological information includes acquiring the biological impedance with the electrode, and
the authentication is performed based on the acquired biological impedance.

* * * * *

UNITED STATES PATENT AND TRADEMARK OFFICE
CERTIFICATE OF CORRECTION

PATENT NO. : 9,779,277 B2  
APPLICATION NO. : 15/061995  
DATED : October 3, 2017  
INVENTOR(S) : Toshihiko Ohtsuka et al.

Page 1 of 1

It is certified that error appears in the above-identified patent and that said Letters Patent is hereby corrected as shown below:

In the Claims

Column 21, Line 32, after "to" insert --claim--.

Column 21, Line 42, after "to" insert --claim--.

Column 22, Line 13, after "to" delete "the".

Column 22, Lines 53-54, after "second end portion" delete "of the one end portion".

Signed and Sealed this  
Second Day of January, 2018

Joseph Matal  
*Performing the Functions and Duties of the*  
*Under Secretary of Commerce for Intellectual Property and*  
*Director of the United States Patent and Trademark Office*